United States Patent
Snyder et al.

(10) Patent No.: US 10,086,568 B2
(45) Date of Patent: Oct. 2, 2018

(54) SEAMLESS SCANNING AND PRODUCTION DEVICES AND METHODS

(71) Applicant: MADE IN SPACE, INC., Moffett Field, CA (US)

(72) Inventors: Michael Snyder, Mountain View, CA (US); Jason Dunn, Mountain View, CA (US); Aaron Kemmer, Mountain View, CA (US); Michael Chen, Mountain View, CA (US)

(73) Assignee: MADE IN SPACE, INC., Moffett Field, CA (US)

( * ) Notice: Subject to any disclaimer, the term of this patent is extended or adjusted under 35 U.S.C. 154(b) by 305 days.

(21) Appl. No.: 14/860,085

(22) Filed: Sep. 21, 2015

(65) Prior Publication Data
US 2016/0082664 A1 Mar. 24, 2016

Related U.S. Application Data

(60) Provisional application No. 62/053,220, filed on Sep. 21, 2014.

(51) Int. Cl.
| | | |
|---|---|---|
| *B29C 67/00* | (2017.01) | |
| *G05B 19/4099* | (2006.01) | |
| *B29C 64/386* | (2017.01) | |
| *B33Y 50/02* | (2015.01) | |

(52) U.S. Cl.
CPC ........ *B29C 67/0088* (2013.01); *B29C 64/386* (2017.08); *G05B 19/4099* (2013.01); *B33Y 50/02* (2014.12); *G05B 2219/32228* (2013.01); *G05B 2219/35134* (2013.01); *G05B 2219/49007* (2013.01)

(58) Field of Classification Search
CPC ......... B33Y 30/00; B33Y 10/00; B33Y 50/02; B33Y 50/00; B29C 64/386; B29C 64/106
USPC .......... 425/375, 113, 145, 143; 700/98, 118, 700/119
See application file for complete search history.

(56) References Cited

U.S. PATENT DOCUMENTS

| | | | |
|---|---|---|---|
| 5,596,504 A | * | 1/1997 | Tata ........................ G06T 17/00 345/420 |
| 6,575,548 B1 | | 6/2003 | Corrigan et al. |
| 7,168,935 B1 | | 1/2007 | Taminger et al. |
| 8,983,957 B2 | | 3/2015 | Rathod |
| 2001/0030383 A1 | | 10/2001 | Swanson et al. |
| 2003/0235635 A1 | | 12/2003 | Fong et al. |
| 2004/0035542 A1 | | 2/2004 | Ederer et al. |
| 2005/0194401 A1 | | 9/2005 | Khoshnevis |
| 2008/0150192 A1 | | 6/2008 | Perret et al. |
| 2009/0208577 A1 | | 8/2009 | Xu et al. |
| 2009/0267269 A1 | | 10/2009 | Lim et al. |

(Continued)

FOREIGN PATENT DOCUMENTS

JP  2009013395  1/2009

*Primary Examiner* — Jonathan Han
(74) *Attorney, Agent, or Firm* — Terry M. Sanks, Esq.; Beusse Wolter Sanks & Maire, PLLC

(57) ABSTRACT

A system comprising a manufacturing device to evaluate an object to determine whether to at least one of repair and replicate the object wherein to repair further comprises at least one of a subtractive process and an additive manufacturing process applied to the object and to replicate further comprises an additive manufacturing process applied to create a second object. Another system and a method are also disclosed.

21 Claims, 13 Drawing Sheets

(56) References Cited

U.S. PATENT DOCUMENTS

| | | | |
|---|---|---|---|
| 2010/0292963 A1* | 11/2010 | Schroeder | A61F 2/30 |
| | | | 703/1 |
| 2012/0041446 A1* | 2/2012 | Wong | A61B 17/1703 |
| | | | 606/96 |
| 2012/0113473 A1 | 5/2012 | Pettis | |
| 2013/0209600 A1 | 8/2013 | Tow | |
| 2014/0039663 A1* | 2/2014 | Boyer | B29C 67/0051 |
| | | | 700/118 |
| 2014/0046473 A1* | 2/2014 | Boynton | B29C 67/0088 |
| | | | 700/119 |
| 2014/0074274 A1* | 3/2014 | Douglas | B29C 67/0055 |
| | | | 700/105 |
| 2014/0277659 A1 | 9/2014 | Kumar et al. | |
| 2014/0316546 A1 | 10/2014 | Walsh et al. | |

\* cited by examiner

500
Hardware Customizer
[ Print New Hardware ] — 520
[ Scan Existing Hardware ] — 530
FIG. 5
600
Print New Hardware
610 — Part/Tool 1 
620 — Part/Tool 2 
630 — Part/Tool 3 
640 — Part/Tool 4 
650 — Back To Main Menu
FIG. 6

Scan Existing Hardware                            1100

```
┌ ─ ─ ─ ─ ─ ─ ─ ─ ─ ─ ─ ─ ─ ┐
│         Step 1              │
│  Place your hardware on the │ ─── 1110
│     scanning platform.      │
└ ─ ─ ─ ─ ─ ─ ─ ─ ─ ─ ─ ─ ─ ┘
```

Scan Existing Hardware                            1100

```
┌ ─ ─ ─ ─ ─ ─ ─ ─ ─ ─ ─ ─ ─ ┐
│        Scanning Now         │
│                             │ ─── 1210
│         ||||||| ▮▮▮         │
└ ─ ─ ─ ─ ─ ─ ─ ─ ─ ─ ─ ─ ─ ┘
```

[ Press When Complete ] ─── 1220

FIG. 12

SEAMLESS SCANNING AND PRODUCTION DEVICES AND METHODS

CROSS REFERENCE TO RELATED APPLICATIONS

This application claims priority to U.S. Provisional Patent Application No. 62/053,220 filed Sep. 21, 2014, by the Applicant, the subject matter of which is incorporated herein by reference in its entirety. This application also incorporates the subject matter of the following patent applications in their entireties by reference: U.S. application Ser. No. 14/331,729 filed Jul. 15, 2014, which claims the benefit of U.S. Provisional Application No. 61/893,286 filed Oct. 21, 2013; U.S. Provisional Application No. 61/908,750 filed Nov. 26, 2013; and U.S. Provisional Application No. 61/931,568 filed Jan. 25, 2014. The present application is also related to U.S. patent application Ser. No. 14/860,029 entitled "Terrestrial and Space-Based Manufacturing Systems" filed Sep. 21, 2015, by the Applicant, which claims the benefit of U.S. Provisional Application No. 62/053,210, filed Sep. 21, 2014; and U.S. patent application Ser. No. 14/860,170 entitled "Digital Catalog for Manufacturing" filed Sep. 21, 2015, by the Applicant, which claims the benefit of U.S. Provisional Application No. 62/053,215, the subject matter of each being incorporated herein by reference in their entireties. The present application is also related to U.S. Provisional Application No. 62/162,626 filed May 15, 2015, and incorporated herein by reference in its entirety.

FIELD OF THE DISCLOSURE

Embodiments generally relates to manufacturing and, more particularly, to systems and methods for seamless creating or duplication of objects.

BACKGROUND

Additive manufacturing and three-dimensional scanning are well known. Creation of duplicate items or repairing scanned items is currently a cumbersome task. Expensive scanning equipment is required. A human user generally must operate the equipment, thereby creating an opportunity for input errors. The user must then convert the scanned data to a part creation file by, for example, correcting any scanning errors, adding support structure, and the like. Automation and/or simplification of this process are desirable.

SUMMARY

This Summary is provided to introduce a selection of concepts. These concepts are further described below in the "Detailed Description" section. This Summary is not intended to identify key features or essential features of this disclosure's subject matter, nor is this Summary intended as an aid in determining the scope of the disclosed subject matter.

Embodiments relate to a system and a method for seamless creating or duplication of objects with at least one of an additive manufacturing process and a subtractive manufacturing process. The system comprises a manufacturing device to evaluate an object to determine whether to at least one of repair and replicate the object wherein to repair further comprises at least one of a subtractive process and an additive manufacturing process applied to the object and to replicate further comprises an additive manufacturing process applied to create a second object.

Another system comprises one or more manufacturing systems comprising at least one or more additive manufacturing processes. The system also comprises a scanner assembly to at least one of scan an object to produce a three dimensional image for use to determine whether to at least one of repair and replicate the object, and inspect at least one of a repaired object and a second produced object manufactured using the one or more manufacturing systems. The system further comprises a housing to maintain the one or more manufacturing systems and scanner assembly in a controlled environment. The system also comprises an environmental control unit to monitor an internal environment within the housing. The system further comprises a processor to determine whether to at least one of repair and replicate the object, and inspect at least one of a repaired object and a second produced object to determine quality.

The method comprises scanning an object with a scanner assembly that is within a housing to create a three-dimensional representation of the object. The method also comprises evaluating a resulting scan taken by the scanner assembly to determine whether to repair or replicate the object using at least one of an additive manufacturing process and a subtractive manufacturing process. The method further comprises recommending whether to at least one of repair and replicate the object. The method also comprises performing at least one of a repair of the object and replicate of the object with at least one of the additive manufacturing process and the subtractive manufacturing process that is located within the housing. The method further comprises providing at least one of a repaired object and a replicated second object for use.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which:

FIG. 5 is an embodiment of a screenshot which may be displayed within a scanning and manufacturing device, presenting various part creation options;

FIG. 6 is an embodiment of a screenshot which may be displayed within a scanning and manufacturing device, presenting various parts which may be created;

FIG. 11 is an embodiment of a screenshot which may be displayed within a scanning and manufacturing device, presenting part scanning instructions;

FIG. 12 is an embodiment of a screenshot which may be displayed within a scanning and manufacturing device, presenting scan status information;

DETAILED DESCRIPTION

Figure 1:
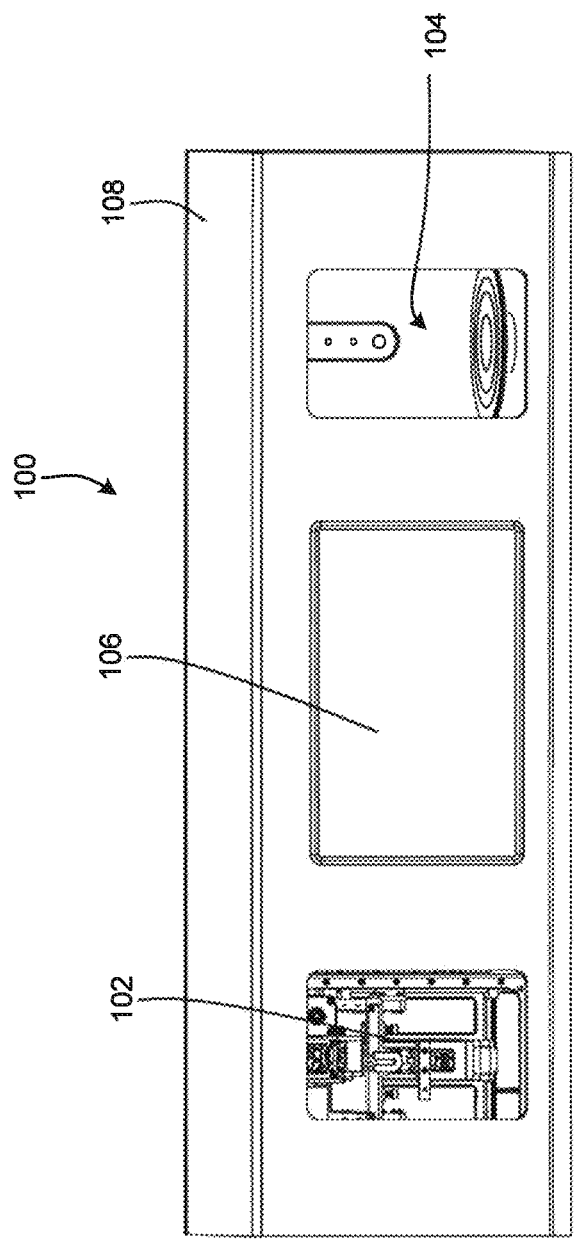
FIG. 1 is a front view of an embodiment of an integrated scanning and manufacturing device.

Embodiments are described herein with reference to the attached figures wherein like reference numerals are used throughout the figures to designate similar or equivalent elements. The figures are not drawn to scale and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Embodiments disclosed herein are directed to a seamless scanning and production device which is easy to use. In an embodiment, an object is placed within the scanner assembly of the device, scanned in response to a user initiating the scanning and production process via, as a non-limiting example, a touchscreen, and a duplicate part is created via an additive manufacturing device. In an embodiment, the scanned part is repaired by manufacturing devices within the device.

Scanning and production devices in accordance with embodiments disclosed herein may be utilized in remote areas, urban environments, retail environments, in close proximity to humans and other locations. Such devices may produce parts from a variety of materials such as metal, polymers, wood, rubber, and the like. Scanning assemblies integrated into such devices may be configured to scan the external structure and/or the internal structure of the provided object.

Figure 2:
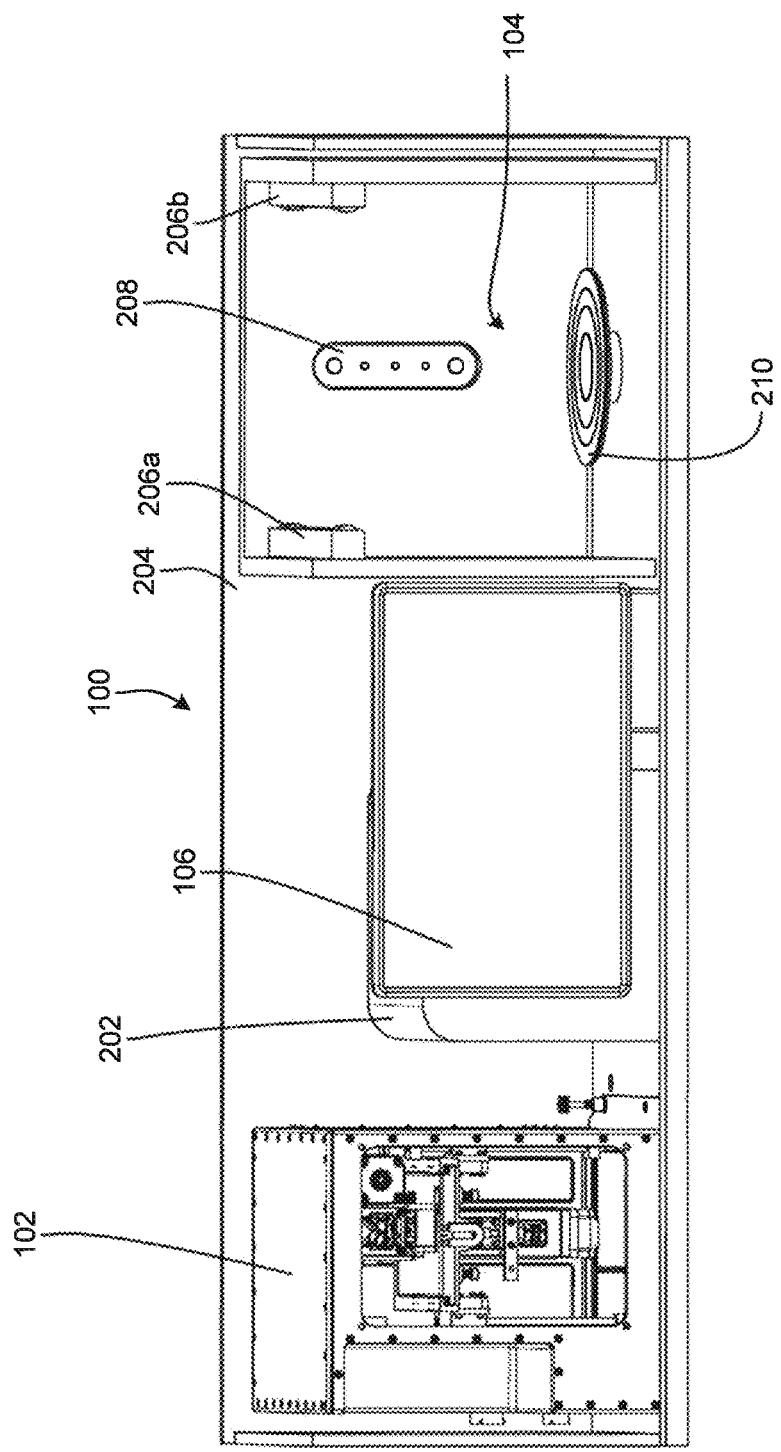
FIG. 2 is a front view of an embodiment of the scanning and manufacturing device depicted in FIG. 1, wherein a cover has been removed.
Figure 3:
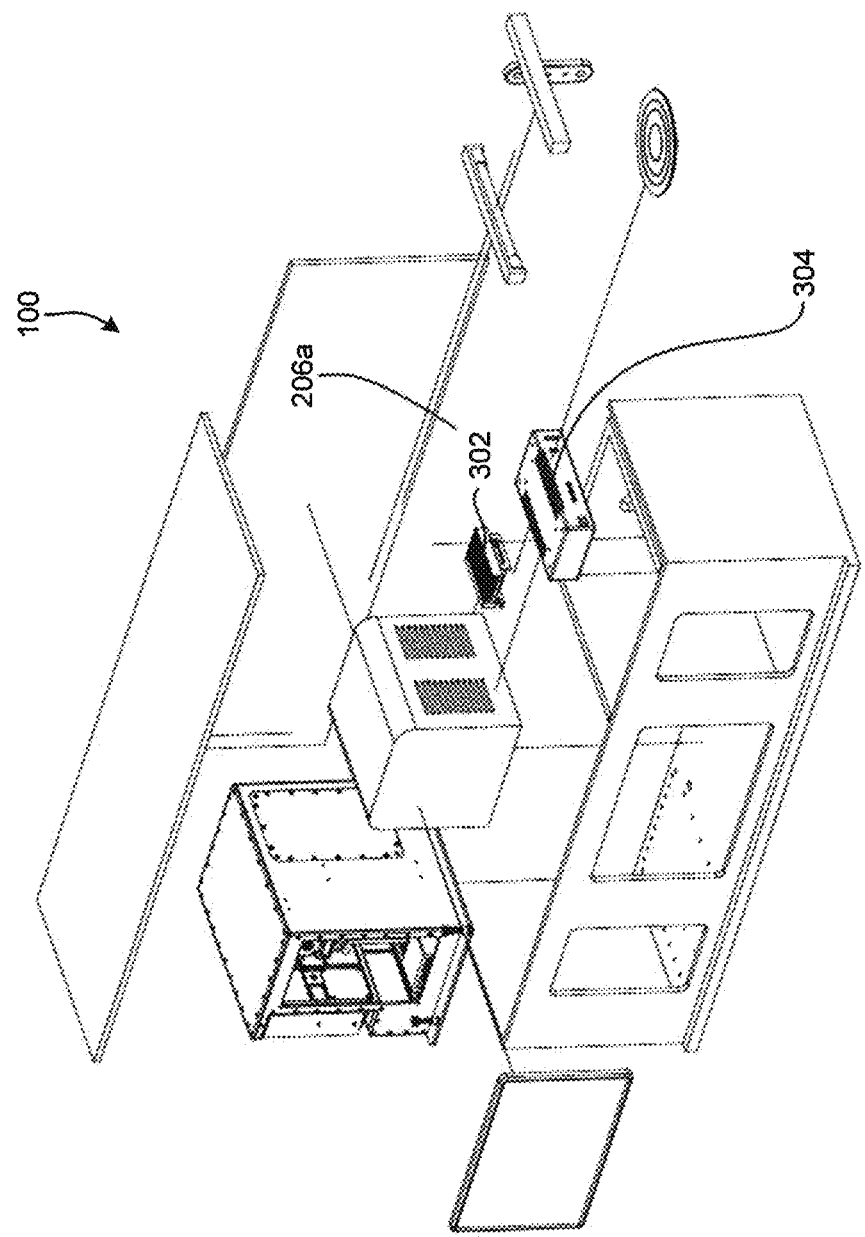
FIG. 3 is an exploded view of an embodiment of the scanning and manufacturing device depicted in FIG. 1.

Now referring to FIGS. 1-3, various views of a self-contained goods manufacturing system 100 including at least one additive manufacturing system 102 is shown. A scanning and production device 100 is disclosed having improved abilities to scan and create a new part or repair the object that was scanned. The device 100 includes one or more manufacturing systems 102, a scanner assembly 104, a user interface 106, and a housing 108. Within the housing 108, an electronics component 202 is positioned, operatively connected to other portions of the device 100 and, in an embodiment, providing network connectivity. The device 100 may also include an integrated power supply 304 and driver control 302.

The scanner assembly 104 may be an assembly of one or more components configured to image or otherwise digitally capture the structure of a provided object. The scanner assembly 104 may include components which enable capture of both internal and external structure. In an embodiment, the scanner assembly 104 may include two optical three-dimensional scanners 206 mounted on opposite sides of a scanning volume. An object may be placed on a rotating scanning platform 210 and illuminated by light source 208, thereby facilitating accurate scanning.

The manufacturing system 102 may be any appropriate additive or subtractive manufacturing device. In an embodiment, a single device may provide for at least one additive process and/or at least one subtractive process. The manufacturing system 102 may be a plurality of such systems, include finishing elements, and any other component apparent to those skilled in the relevant art(s) after reading the description herein.

The manufacturing system 100 may include a housing 102. The housing 102 may be an enclosure which contains other portions of the system 100, allowing the internal environmental control unit and other systems to regulate the internal environment, purify the environment and/or protect users and equipment from dangers associated with nominal and off-nominal operations.

The system 100 may be operable via a user interface 106. The user interface 106 may include a display, physical inputs, voice command functionality and the like.

A non-limiting mode of operation is as follows. First, a part is placed in the device 100 at the scanner assembly 104. The scanner assembly 104 scans the object. Software and/or human intervention is used to analyze the scan generated. If the object is to be repaired, the solution may be presented to the user via the user interface 106. Other options, discussed below, may be presented in the case or repair or duplication. The user then selects the choices that are desired which include changes to the geometry and materials or the user selects to do nothing besides duplicate or repair. The part is then produced or repaired with desired attributes using the manufacturing system 102.

In an embodiment, the device 100 may have access to a catalog of parts or goods, such as, but not limited to, a plurality of parts or goods, to enable the scanned part to be looked up if it exists or added if it does not. This will allow a part that is in the catalog to be looked up and then produced using manufacturing reference information and not rely solely on the scanned information besides defining the part desired. The manufacturing reference information may comprise, but is not limited to, a template or another configuration which provides for dimensional information for replicating at least one of the parts or goods. If the part does not exist in the catalog the scan of it is refined in software and presented to the user for options. If manufacturing component 102 is unable to produce the part, then it can either send off for remote production or educate the user on the location of devices capable of performing the production.

Applications for the embodiment disclosed above includes for tooling, hardware components, complex mechanisms, electronics, integrated complex assemblies, basic geometric objects, etc.

The device 100 may have the ability to support additive and subtractive processes as well as post processing methods such as coating, annealing, etc. With respect to subtractive processes, as a non-limiting example, if an object is damaged, and the desire is to repair the damaged object, the subtractive process may be used to remove a part or section of the damaged area. In another non-limiting example, the subtractive process may be used to remove a portion, segment or section of the damaged object to replace all of a section with the additive manufacturing process. Thus, if a damaged part is made of two different materials and the damage occurred only to one of the materials, the subtractive manufacturing process may be used to remove the material that is damaged. In another non-limiting example, the portion removed may be a logical part removed based on a configuration of the object so that structural strength of the additive replaced part is sufficiently supported.

Thus, in an embodiment, the catalog of parts or goods may comprise a plurality of portions, segments or sections of any one of a plurality of parts or goods. A manufacturing process to apply to create and/or install the portion, segment or section of any particular good to repair the good or part may then be determined based on the additive manufacturing reference information maintained in the catalog or as ascertained from a scan of the good or part. Thus, as disclosed herein, the catalog may be used to retain not only manufacturing reference information about a complete part, but it may also be used to retain information about a replacement portion of a part used to repair a portion of the part. The manufacturing reference information may further comprise directions, or control information, for controlling the manufacturing device to prepare an area where the repair it to be performed, such as, but not limited to, removing additional material from the part, and/or the manufacturing process for creating the repair or replacement segment or portion.

The subtractive process may include, but is not limited to, computer numerical control CNC milling and turning, drilling, etc. More specifically, the subtractive process may be any process that may be used to remove a part or section of an object. This may be accomplished with a tool that makes contact with the object or even a tool that applies energy (such as, but not limited to, a laser) or another substance ((such as, but not limited to, a gas and/or a liquid (a solvent, etc.)) to the object.

The device 100 may contain 3D scanning devices and inspection hardware, or an inspection device that can determine the quality of the produced components. The term inspection device is not used to limit, meaning it is not used to include both the 3D scanning devices and inspection hardware, but is used to identify an element, apparatus, or system that can determine a quality of the replacement object or repaired object.

In an embodiment, the device 100 is optimized for ease of use. A user may place an object in the scanner assembly 104, the software interprets the scanned data without user interaction and decides if it can be manufactured and graphically cleans up the scan for presentation to the user. If it can be manufactured, the graphic representation allows the user to modify and customized the resulting part, if desired, but requirements for the end use will be instilled to enable parts to be made that can withstand the forces or work environment it will operate in. As a non-limiting example, if a particular part is usable in a plurality of operational environments, such as, but not limited to, an object used as a prototype which is shaped to work operational, but does not have a build to withstand stresses that may be experienced during desired prolong operational use, the part may be manufactured depending on the intended need or purpose at that time.

Figure 4:
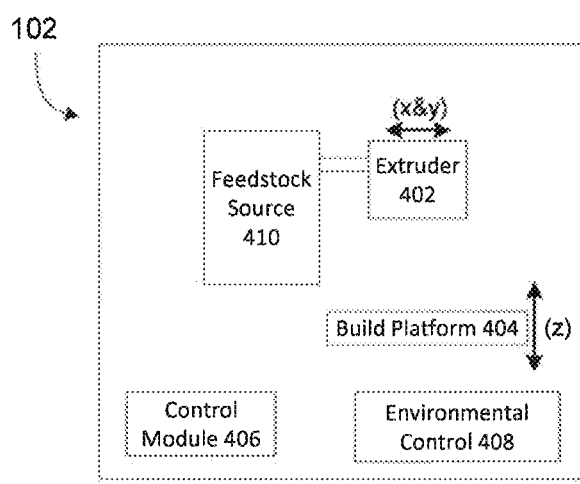
FIG. 4 is a block diagram of an embodiment of an additive manufacturing device.

Now referring to FIG. 4, a block diagram of an exemplary additive manufacturing device 102 is shown. In an embodiment, the manufacturing device is the additive manufacturing device 102. The additive manufacturing device 102 is configured to produce (or replicate) goods or portions of goods using filament supplied by feedstock cartridge 410. The additive manufacturing device 102 may be configured to utilize polymer filament, metal filament, filament made from a mixture of materials, and the like.

The additive manufacturing device 102 comprises a filament extruder 402 positionable in two axes (e.g., x and y axes). The additive manufacturing device 102 may be a fused deposition-type device or any other additive manufacturing device apparent to those skilled in the relevant art after reading the description herein, including, but not limited to, a stereolithographic device, an electron beam freeform fabrication device, and a selective laser sintering device.

The additive manufacturing device 102 further may comprise a build platform 404, or processing area, positionable in a third axis (e.g., the z-axis). The build platform 404 is configured to support goods as they are being constructed. The build platform may be build tray 410. In another embodiment, the build platform 404 is omitted. The build platform 404 is a support which holds another part, thereby enabling the additive manufacturing device 102 to add additional portions (i.e., layers) to the part being held. Actuators are attached to a filament extruder 402 and the build platform 404. In an embodiment, the additive manufacturing device 102 comprises one actuator for each axis.

The filament extruder 402 is adapted to create a desired good or portion of good on the build platform 404 via deposition of a polymer or other material. Deposition may be done in an additive manner, such as a layer-wise or raster pattern. The positions of the filament extruder 402 and the build platform 404 during construction may be controlled by a build control module 406, electrically connected to each actuator. The build control module 406 may be software, hardware, or a combination of software and hardware. The build control module 406 is configured to cause the desired part (e.g., a support structure) to be produced by additive manufacturing device 102.

The filament extruder 402 is connected to a feedstock source 410. An environmental control 410 is configured to regulate the environment of the additive manufacturing device 102 and/or the surrounding device 100. In an embodiment, the environmental control 410 comprises at least one fan, a temperature regulation device (e.g., a heater, an air conditioning unit), and a filter. The environmental control 410 regulates one or more of: temperature, humidity, and air quality within the additive manufacturing device 102, thereby preventing outgassing and contamination of the environment in which the additive manufacturing device 102 is located during operation.

Now referring to FIGS. 5-12, various screenshots which may be displayed by user interface 106 during scanning and printing operations are shown. FIG. 5 is an embodiment of a screenshot which may be displayed within a scanning and manufacturing device, presenting various part creation options. More specifically, a hardware customizer option 500 is shown where a first option is for printing new hardware 520 and a second option is for scanning the existing hardware 530. As used herein, hardware pertains to the object, product, etc.

FIG. 6 is an embodiment of a screenshot which may be displayed within a scanning and manufacturing device, presenting various parts which may be created. A print new hardware prompt 600 is provided where a particular tool option 610, 620, 630, 640 may be selected. An option to return to a main menu 650 or another menu is also provided.

Figure 7:
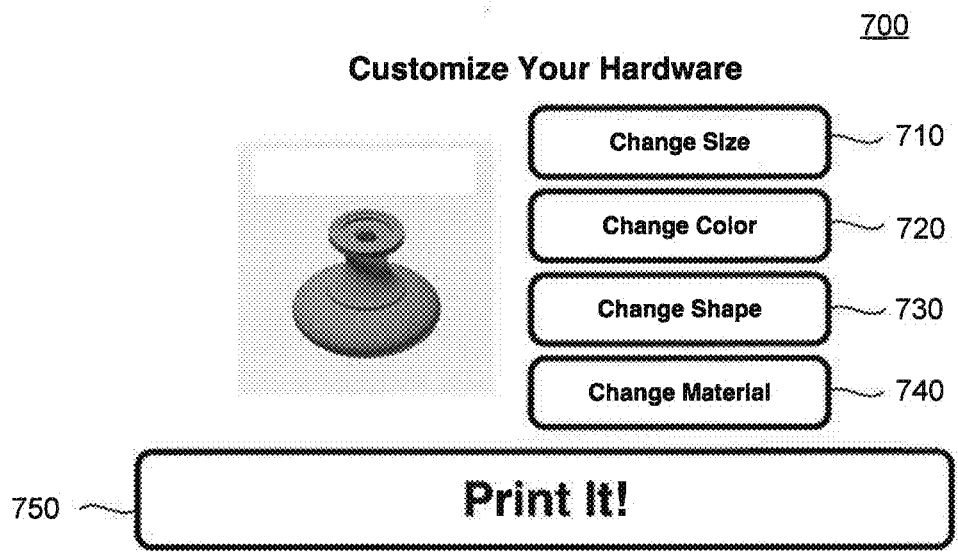
FIG. 7 is an embodiment of a screenshot which may be displayed within a scanning and manufacturing device, presenting various part customization options.

FIG. 7 is an embodiment of a screenshot which may be displayed within a scanning and manufacturing device, presenting various part customization options. As illustrated, the hardware may be customized 700. Non-limiting examples of customization include, but is not limited to, change size 710, change color 720, change shape 730, change material 740, etc. As a non-limiting example, change shape 730 may comprise expanding dimensions of the object. As a non-limiting example, change material 740 may comprise selecting a material for an intended purpose of the object. Once any customization is complete, the object may be printed by selecting a print option 750.

Figure 8:
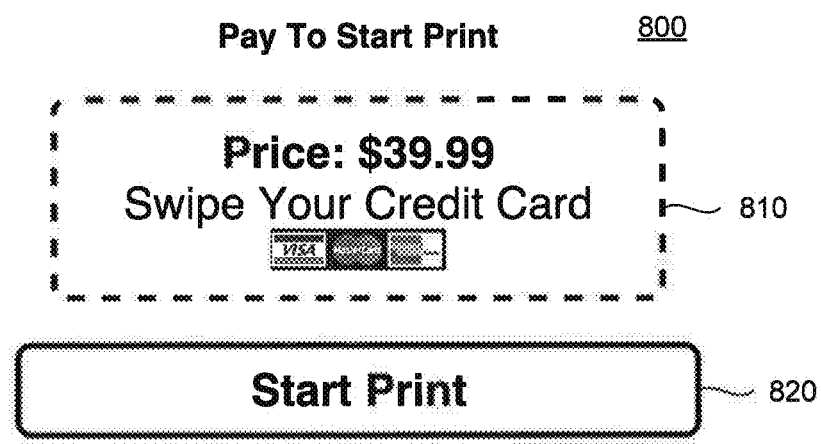
FIG. 8 is an embodiment of a screenshot which may be displayed within a scanning and manufacturing device, presenting a payment screen.

FIG. 8 is an embodiment of a screenshot which may be displayed within a scanning and manufacturing device, presenting a payment screen. As illustrated when the device 100 is utilized for public use, a pay to print option 800 may be available. Once a financial transaction 810 has been completed, a print option 820 may be selected.

Figure 9:
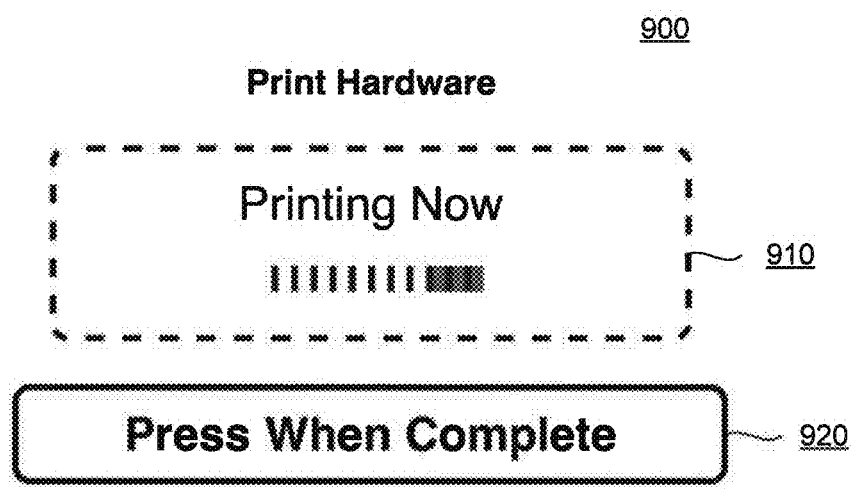
FIG. 9 is an embodiment of a screenshot which may be displayed within a scanning and manufacturing device, presenting part creation status information.

FIG. 9 is an embodiment of a screenshot which may be displayed within a scanning and manufacturing device, presenting part creation status information. As illustrated a print hardware option 900 may provide for an icon which illustrates printing status 910. When the printing status 910 shows that printing is complete, a "press when complete" option 920 is available. When selecting this selection, the printed object may only then be accessed from within the device 100.

Figure 10:
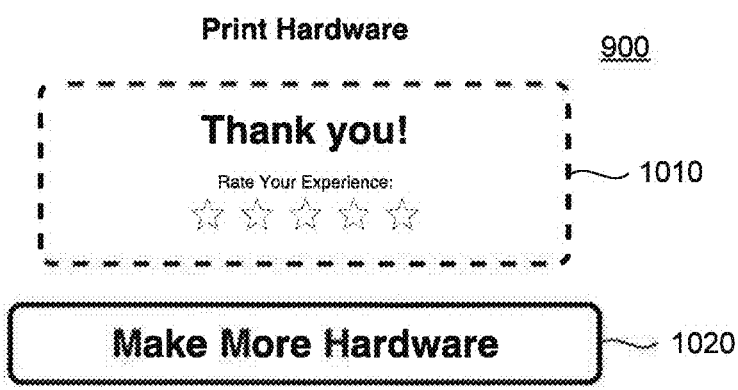
FIG. 10 is an embodiment of a screenshot which may be displayed within a scanning and manufacturing device, presenting a part completed message.

FIG. 10 is an embodiment of a screenshot which may be displayed within a scanning and manufacturing device, presenting a part completed message. As illustrated, the print hardware 900 may have a display screen 1010 acknowledging that the transaction and printing process are complete. A "make more hardware" option 1020 may also be provided.

FIG. 11 is an embodiment of a screenshot which may be displayed within a scanning and manufacturing device, presenting part scanning instructions. A scan existing hardware option 1100 is provided. A screen 1110 providing instructions for a user to follow may be provided. A continue option 1120 selection may also be provided for selection once the instruction is completed.

FIG. 12 is an embodiment of a screenshot which may be displayed within a scanning and manufacturing device, presenting scan status information. The scan existing hardware option 1100 is again provided. A screen 1210 illustrating a scan process is also provided. In an embodiment the screen 1110 providing instructions may be the same screen 1210 that provides the scan status. In another embodiment, two different screens 1110 and 1210 may be provided. A press when complete option 1220 may also be provided when the scan is complete.

Figure 13:
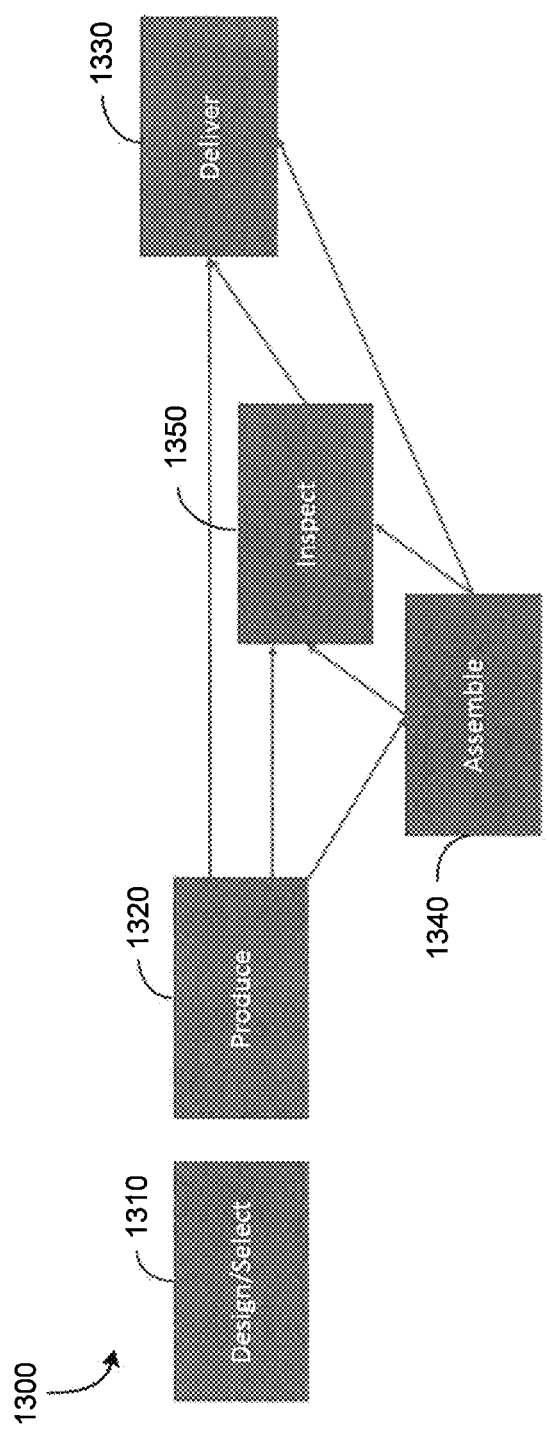
FIG. 13 is a flowchart depicting an embodiment of a process for creating and delivering a user-designated good.

Referring now to FIG. 13, a flowchart depicting an embodiment of a process 1300 for creating and delivering a user-designated good is shown. As shown, the process or method, 1300 may comprise a design/select step, at 1310. The design/select step, at 1310, provides for determining a product to make with at least one of a plurality of additive manufacturing processes located within an enclosure to control an environmental condition within the additive manufacturing process area. Determining the product may comprise scanning a prior product with a scanning device to ascertain the product to make or selecting the product to make with a user interface that has access to a database of a plurality of products.

A produce step, at 1320 is shown. The produce step, at 1320, provides for producing the product with at least one of the plurality of additive manufacturing processes. A deliver step, at 1130 is shown. The delivery step, at 1330, provides the product to a user outside of the enclosure where the environmental condition is controlled for the at least one of the plurality of additive manufacturing processes. This is further accomplished by transporting the product with a conveying system to an area outside of the enclosure where the environmental condition is controlled for the at least one of the plurality of additive manufacturing processes. An assembly step, at 1340, is provided. The assembly step may be provided when the product is made of more than one material. The assembly step may include transporting the product to multiple locations within the system 100 during manufacture and prior to delivery, at step 1330. An inspect step, at 1350, is also provided to provide for inspecting the product prior to delivery, at 1330. As disclosed above, the inspect step, at 1350, may be accomplished with a scanner to ensure that the product meets a quality standard for the product.

The process 1300 may utilize the system 100 disclosed herein to produce a desired good. The system 100 may be designed to focus on retail items, making them available digital, and function as a vending type machine. A digital object may be selected and a physical item will be constructed. In another embodiment, the digital object is designed from an existing object. Items that may be produced include hardware items such as, but not limited to, nails, screws, piping, fixtures, as well as tools such as hammers, screw drivers, wrenches, pliers, etc. Also, it is able to produce consumer products and items with electrical components. The system 100 may be of a size that can fit into a variety of locations including commercial stores, homes, and integrated into vehicles such as cars, trucks, boats, aircraft, spacecraft, etc. The user interface 106 may be designed to accommodate both adults and children's understanding on how system 100 functions.

Figure 14:
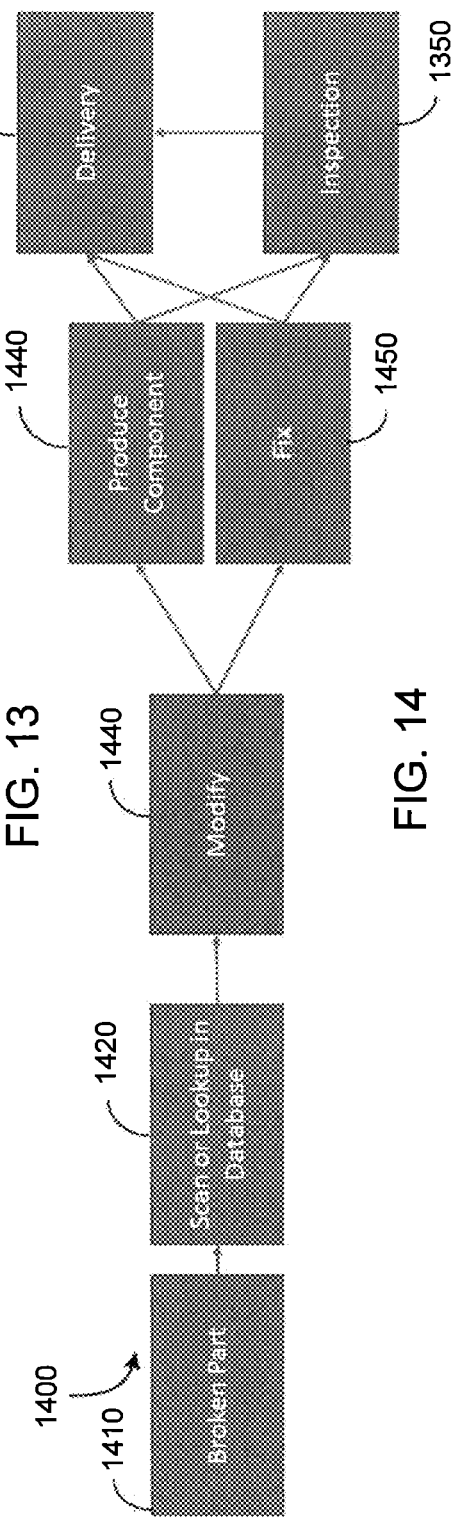
FIG. 14 is a flowchart depicting an embodiment of a process for repairing or reproducing a user-supplied object.

Referring now to FIG. 14, a flowchart depicting an exemplary process 1400 for repairing or reproducing a user-supplied part is shown. The process 1400 may utilize the system 100 to fix, repair and/or reproduce a desired good.

An object, at 1410, may be placed into a portion of system 100 in order for it to be scanned, at 1220. The object may be a broken component. The scan may be used to either create a replacement part or to fix the scanned component. In another embodiment, a mobile communications device may be used to scan and/or order a component. In another embodiment, the inspect step, at 1350, may detect an error with a recently constructed component.

A modify step, at 1430, is provided where the system can correct the scanned digital image. As a non-limiting example, if the scanned digital image is missing a section of the image, based on the image captured, the missing section may be extrapolated and created by the system 100. A similar approach may be utilized to fix a component, as disclosed below. This may also be used to fix a scanned component. In another embodiment, through the user interface, a user can simply look up a replacement component in a database, at 1420. The database may comprise a plurality of digital images of components, goods, products that can be made with the system 100.

In one embodiment, at a produce component step, at 1440, the system produces the component, good, or product. The component is inspected, at 1350 then delivered, at 1350, or simply delivered, at 1330.

If the system 100 is being used to fix a broken component, the system 100 applies an appropriate additive manufacturing process to fix the component, at 1450. The component is inspected, at 1350 then delivered, at 1350, or simply delivered, at 1330.

Thus, as disclosed above, quality control will be also an aspect of the system 100. Both the process 1300 and the process 1400 may include an inspection step, at 1350. Determined based upon the process, an inspection system will verify the quality of the produced good and either accept or reject it. Rejected pieces may be sent to the recycler 122 for repurposing. One method of quality control for duplication of components involves overlaying the scan of the good that is to be duplicated with the final good or good throughout the manufacturing process. The overlay will show the variation or difference from the desired good and can be fed through the user's defined tolerance preference. This could function as follows: put object on tray; scan it; remove part; print part in same spot; scan as printing to maintain accuracy; scan final part with overlay of original scan; compare final scan and scan of initial part; generate accuracy number; job done if accuracy is sufficiently high; rejected if not accuracy is sufficient.

In an embodiment, device 100 is designed to focus on retail environments and produce small items, as suggested above with respect to FIG. 8. The user interface 106 is designed to accommodate both adults and children's understanding on how system 100 functions.

An object may be placed into a portion of system 100 in order for it to be scanned. In an embodiment, a mobile communications device can be used to scan and/or order components.

Quality control will be also an aspect of device 100. Both process 1300 and process 1400 may include an inspection step. Determined based upon the process, an inspection system will verify the quality of the produced good and either accept or reject it. One method of quality control for duplication of components involves overlaying the scan of the good that is to be duplicated with the final good or good throughout the manufacturing process. The overlay will show the variation or difference from the desired good and can be fed through the user's defined tolerance preference. This could function as follows: put object on tray; scan it; remove part; print part in same spot; scan as printing to maintain accuracy; scan final part with overlay of original scan; compare final scan and scan of initial part; generate accuracy number; job done if accuracy is sufficiently high; rejected if not accuracy is sufficient.

In an embodiment, device 100 may accept payment in any electronic medium as well as direct cash supply.

Figure 15:
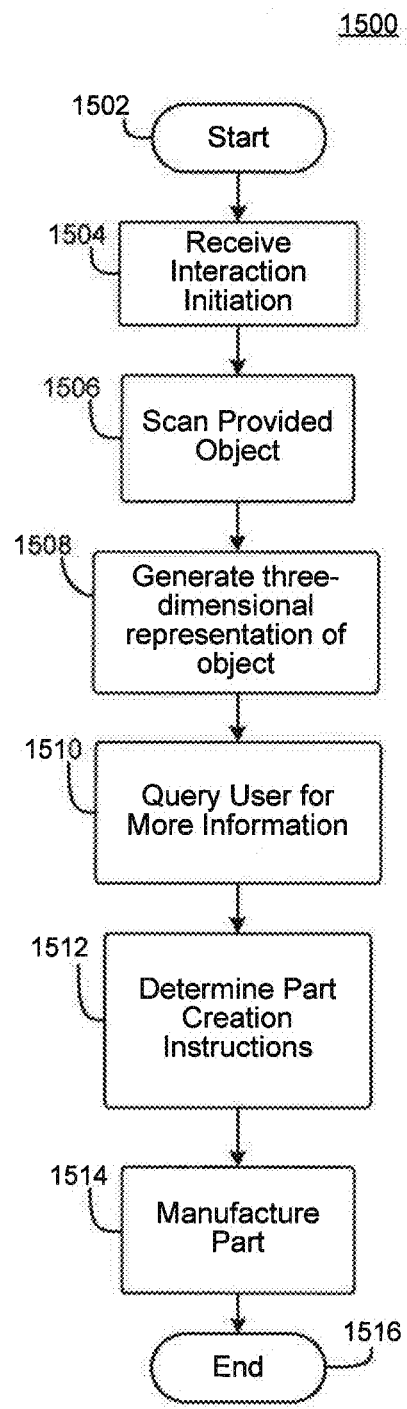
FIG. 15 is a flowchart depicting an embodiment of a process for manufacturing a part using a scanning and production device.

Referring to FIG. 15, a flowchart depicting an embodiment of a process 1500 for manufacturing a part using scanning and production device 100 is shown. The process 1500, which may execute within system 100, begins at step 1502 with control passing immediately to step 1504. At step 1504, device 100 receives an interaction initiated by user 102. The interaction may comprise a voice command or other audio sound, a gesture or other type of movement, placing an object within scanning assembly 104 and/or physical contact. Types of physical contact may include directly touching a portion of device 100, such as touchscreen 106, keyboard, joystick, mouse, or any other similar component as will be appreciated by those skilled in the relevant art(s) after reading the description herein.

At step 1506, an object provided by the user is scanned by scanning assembly. In an embodiment, the user supplies a scan, images, or video of the object to be repaired or duplicated. At step 1508, draft part creation instructions are created. Part creation instructions require an accurate schematic (e.g., a three-dimensional scan) of the provided part. In an embodiment, the scan created in step 1506 is processed by modules within device 100 in order to generate the schematic. The network connected or cloud-based computing devices may also be used to device 100 generates the schematic. In another embodiment, data from step 1506 is sent to off-site individuals who utilize the data to create an accurate schematic.

At step 1510, the user interface queries user 102 as needed to obtain more information about what, if any, changes should be made. Where the object is being repaired, the user may confirm what portions should be fixed and approve proposed fixes. Where the object is being duplicated, the user may specify the material to make the new part out of the size, the color, and other customizations apparent to those skilled in the relevant art(s) after reading the description herein. At step 1512, information from steps 1508 and 1510 is used to create operation instructions for manufacturing device 102. At step 1514, depending on initial instructions, device 100 repairs the object provided or creates a new part. Where the object is repaired, it may be placed in manufacturing device 102 by the user as directed by the user interface 106 or some other portion of device 100. In an embodiment, the manufacturing device and the scanner assembly 104 share the same scanning and build volume, eliminating the need to move the object that is being repaired. The process 1500 terminates at step 1516.

Figure 16:
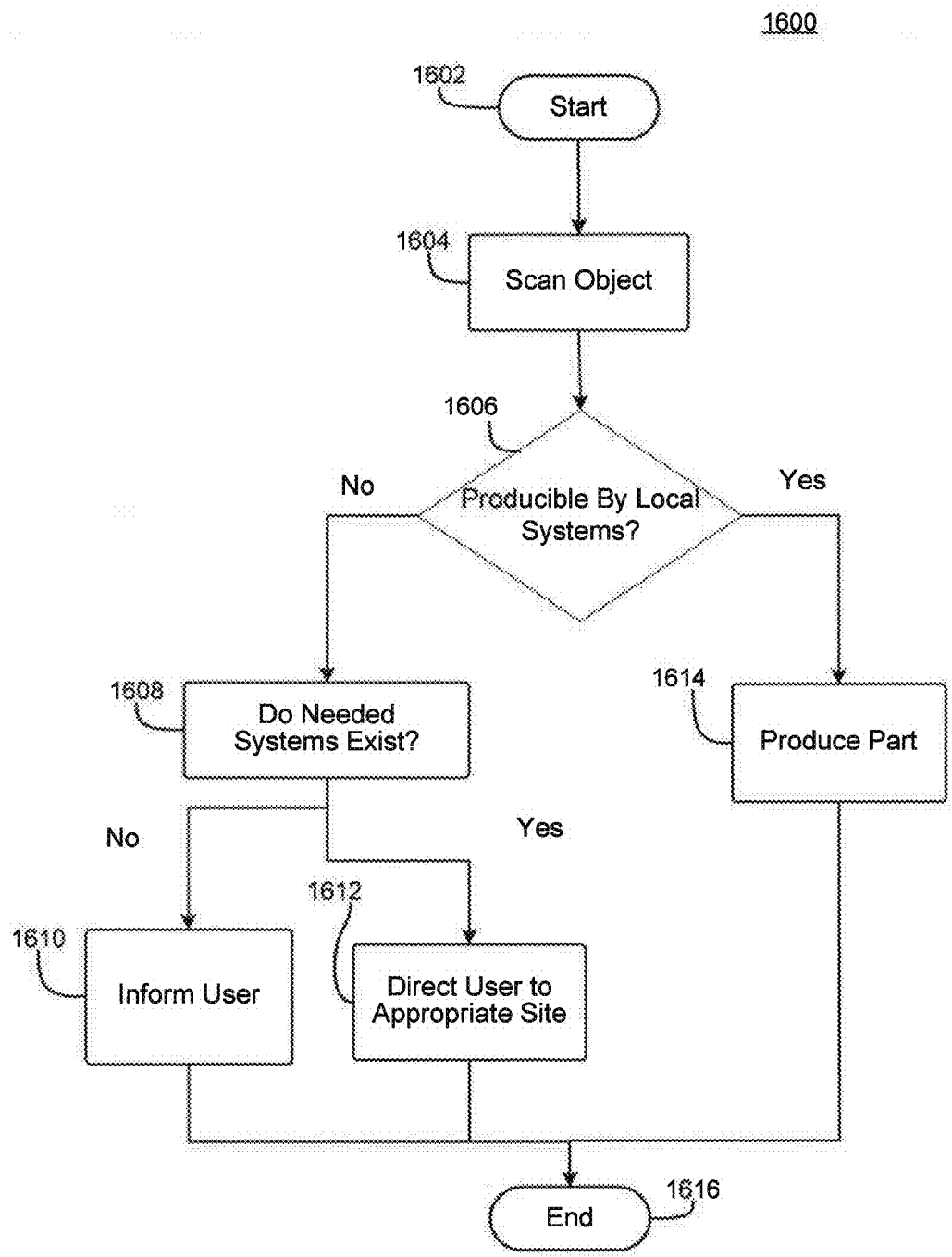
FIG. 16 is a flowchart illustrating an embodiment of a process for determining if a scanned object can be created by a scanning and production device.

Referring now to FIG. 16, a flowchart illustrating an embodiment of a process 1600 for determining if a scanned object can be created by scanning and production device 100 is shown. The process 1600, which may execute within system 100, begins at step 1602 with control passing immediately to step 1604. At step 1604, the device 100 scans a provided object with scanner assembly 104. At step 1606, it is determined, or recommended, whether the scanned object is capable of being generated by device 100. Such a determination may be made by processors, controllers, and similar computational modules within controlling electronics 202 as recognized by those skilled in the relevant art(s). If the determination is in the negative, the process 1600 proceeds to step 1608.

If the determination is in the affirmative, the process 1600 proceeds to step 1614 and the part is produced and the process 1600 terminates at step 1616. At step 1608, it is determined if any device 100 or similar manufacturing system currently exists that is capable of generated the scanned object. If the determination is in the negative, the process 1600 proceeds to step 1610 and the user is informed. Then the process 1600 proceeds to step 1616 and ends. If the answer is in the positive, the process 1600 proceeds to step 1612, the user is directed to the appropriate site and the process 1600 terminates at step 1616.

Figure 17:
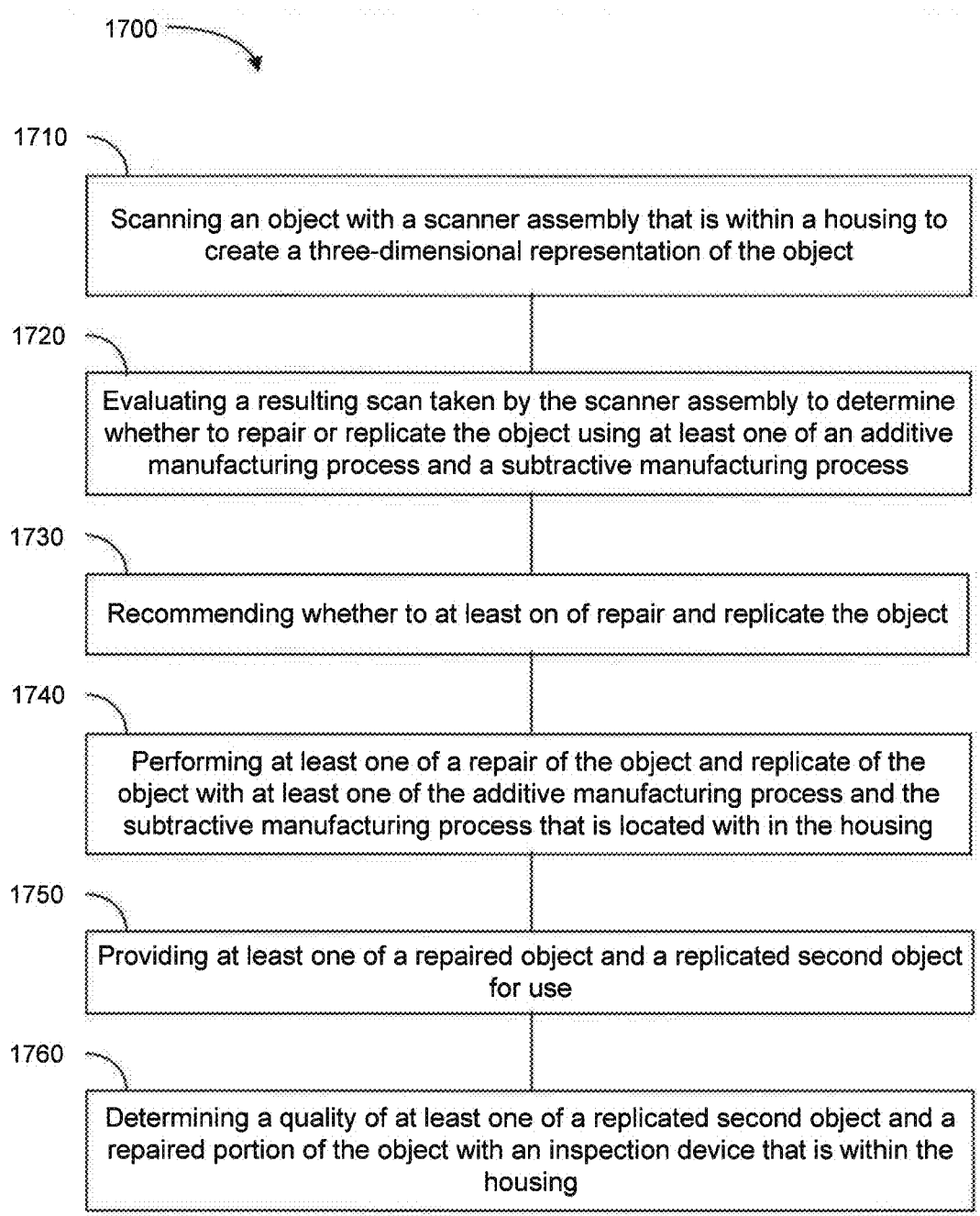
FIG. 17 is a flowchart illustrating an embodiment of a method for repairing or creating a replacement object.

FIG. 17 is a flowchart illustrating an embodiment of a method for repairing or creating a replacement object. The method 1700 comprises scanning an object with a scanner assembly that is within a housing to create a three-dimensional representation of the object, at 1710. The method 1700 further comprises evaluating a resulting scan taken by the scanner assembly to determine whether to repair or replicate the object using at least one of an additive manufacturing process and a subtractive manufacturing process, at 1720. The method 1700 also comprises recommending whether to at least on of repair and replicate the object, at 1730. The method 1700 also comprises performing at least one of a repair of the object and replicate of the object with at least one of the additive manufacturing process and the subtractive manufacturing process that is located within the housing, at 1740. The method also comprises providing at least one of a repaired object and a replicated second object for use, at 1750.

The method 1700 may further comprise determining a quality of at least one of a replicated second object and a repaired portion of the object with an inspection device that is within the housing, at 1760. When recommending whether to replicate the object, at 1730, the method 1700 may further comprise obtaining additive manufacturing reference information for the object maintained in a catalog, the catalog comprises a plurality of additive manufacturing reference information for various objects to replicate a respective object based on the reference information in the catalog. When the reference information for the object is excluded from the catalog, the method may further comprise refining the scan created by the scanner for use by the at least one additive manufacturing process and the subtractive manufacturing process to create the replicated second object. Evaluating a resulting scan, at 1720 may further comprise evaluating the resulting scan with a processor to autonomously determine whether to at least one of repair or replicate the object using at least one of the additive manufacturing process and the subtractive manufacturing process. Performing at least one of a repair of the object, at 1740, may further comprise performing the subtractive manufacturing process on the object to remove a section from the object prior to performing the additive manufacturing process.

Though the steps shown above are illustrated as being sequential, they do not have to be performed sequentially. The illustration is simply provided in this format for simplicity and clarity. Furthermore, dependent step, 1760 may be performed in combination with or without the other independent steps.

Figure 18:
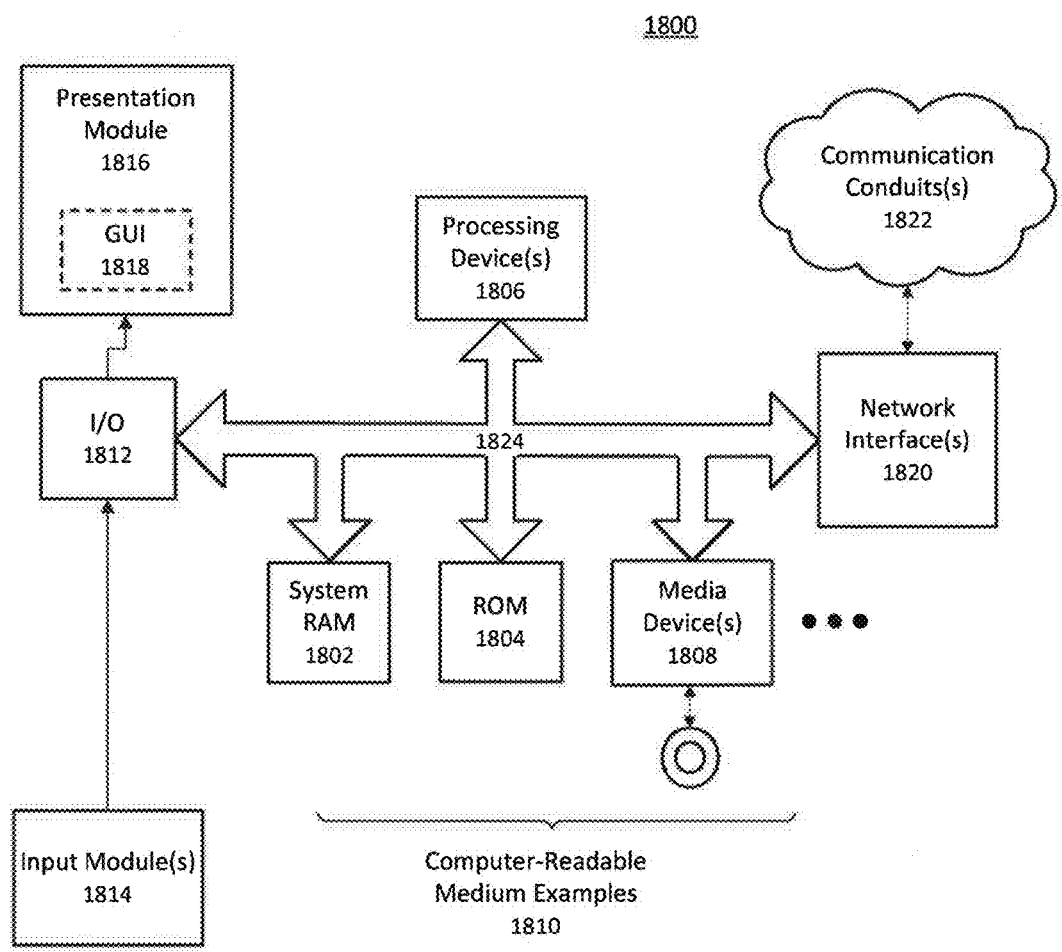
FIG. 18 is a block diagram illustrating an embodiment of a computer system useful for implementing an embodiment disclosed herein.
Figure 18:
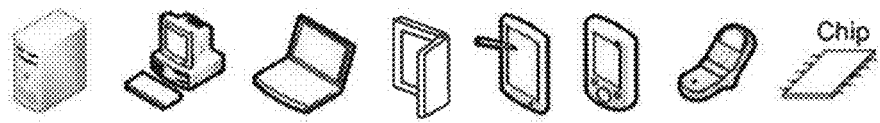

Referring to FIG. 18, a Hock diagram illustrating an embodiment of a computer system useful for implementing an embodiment is shown. FIG. 18 sets forth an illustrative computer system that may be used to implement computing functionality 1800, which in all cases represents one or more physical and tangible processing mechanisms. Computing functionality 1800 may comprise volatile and non-volatile memory, such as RAM 1802 and ROM 1804, as well as one or more processing devices 1806 (e.g., one or more central processing units (CPUs), one or more graphical processing units (GPUs), and the like). Computing functionality 1800 also optionally comprises various media devices 1808, such as a hard disk module, an optical disk module, and so forth. Computing functionality 1800 may perform various operations identified above when the processing device(s) 1706 execute(s) instructions that are maintained by memory (e.g., RAM 1802, ROM 1804, and the like).

More generally, instructions and other information may be stored on any computer readable medium 1810, including, but not limited to, static memory storage devices, magnetic storage devices, and optical storage devices. The term "computer readable medium" also encompasses plural storage devices. In all cases, computer readable medium 1810 represents some form of physical and tangible entity. By way of example, and not limitation, computer readable medium 1810 may comprise "computer storage media" and "communications media."

"Computer storage media" comprises volatile and non-volatile, removable and non-removable media implemented in any method or technology for storage of information, such as computer readable instructions, data structures, program modules, or other data. Computer storage media may be, for example, and not limitation, RAM 1802, ROM 1804, EEPROM, Flash memory, or other memory technology, CD-ROM, digital versatile disks (DVD), or other optical storage, magnetic cassettes, magnetic tape, magnetic disk storage, or other magnetic storage devices, or any other medium which can be used to store the desired information and which can be accessed by a computer.

"Communication media" typically comprise computer readable instructions, data structures, program modules, or other data in a modulated data signal, such as carrier wave or other transport mechanism. Communication media may also comprise any information delivery media. The term "modulated data signal" means a signal that has one or more of its characteristics set or changed in such a manner as to encode information in the signal. By way of example, and not limitation, communication media comprises wired media such as a wired network or direct-wired connection, and wireless media such as acoustic, RF, infrared, and other wireless media. Combinations of any of the above are also included within the scope of computer readable medium.

The computing functionality 1800 may also comprise an input/output module 1812 for receiving various inputs (via input modules 1814), and for providing various outputs (via one or more output modules). One particular output module mechanism may be a presentation module 1816 and an associated GUI 1818. The computing functionality 1800 may also include one or more network interfaces 1820 for exchanging data with other devices via one or more communication conduits 1822. In some embodiments, one or more communication buses 1824 communicatively couple the above-described components together.

Communication conduit(s) 1822 may be implemented in any manner (e.g., by a local area network, a wide area network (e.g., the Internet), and the like, or any combination thereof). Communication conduit(s) 1822 may include any combination of hardwired links, wireless links, routers, gateway functionality, name servers, and the like, governed by any protocol or combination of protocols.

Alternatively, or in addition, any of the functions described herein may be performed, at least in part, by one or more hardware logic components. For example, without limitation, illustrative types of hardware logic components that may be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

The terms "module" and "component" as used herein generally represent software, firmware, hardware, or combinations thereof. In the case of a software implementation, the module or component represents program code that performs specified tasks when executed on a processor. The program code may be stored in one or more computer readable memory devices. The features of the present disclosure described herein are platform-independent, meaning that the techniques can be implemented on a variety of commercial computing platforms having a variety of processors (e.g., set-top box, desktop, laptop, notebook, tablet computer, personal digital assistant (PDA), mobile telephone, smart telephone, gaming console, and the like).

As an overview, embodiments disclosed herein meet the above-identified needs by providing devices and related methods which scan an object to be repaired or duplicated, scans the object with minimal human interaction, creates part creation instructions via on board or off-site processing and produces a duplicate object according to the created part creation instructions via one or more attached manufacturing devices.

Furthermore as disclosed above, a scanning and production device is disclosed. The device is configured to be operated by individuals with little or no experience with creating models of physical objects or the manufacturing devices integrated into the device, such as an additive manufacturing device. The device includes a scanner assembly and one or more manufacturing devices such as an additive manufacturing device. The scanner assembly and manufacturing device are controlled by onboard electronics. A user interface such as a touchscreen is included which receives user inputs, presents prompts and status updates to the user and the like. In an embodiment, users interact with the device by placing/removing the part to be duplicated in the scanner assembly, interacting with the user interface, and removing the completed part from the manufacturing device. In this manner, the user's interaction with the device is limited, making it more user friendly and easier for user's with little experience to operate.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order or importance, but rather the terms first, second, etc., are used to distinguish one element from another.

Unless otherwise defined, all terms (including technical and scientific terms) used herein have the same meaning as commonly understood by one of ordinary skill in the art to which embodiments of the invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While various disclosed embodiments have been described above, it should be understood that they have been presented by way of example only, and not limitation. Numerous changes, omissions and/or additions to the subject matter disclosed herein can be made in accordance with the embodiments disclosed herein without departing from the spirit or scope of the embodiments. Also, equivalents may be substituted for elements thereof without departing from the spirit and scope of the embodiments. In addition, while a particular feature may have been disclosed with respect to only one of several implementations, such feature may be combined with one or more other features of the other implementations as may be desired and advantageous for any given or particular application. Furthermore, many modifications may be made to adapt a particular situation or material to the teachings of the embodiments without departing from the scope thereof.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

Therefore, the breadth and scope of the subject matter provided herein should not be limited by any of the above explicitly described embodiments. Rather, the scope of the embodiments should be defined in accordance with the following claims and their equivalents.

What we claim:

1. A system comprising;
    a scanner assembly to image an object placed on a platform within the scanner assembly, the scanner assembly produces an external surface of the object and an internal structure of the object;
    a manufacturing device comprising an additive manufacturing subsystem that at least one of repairs and replicates the object with at least one of stereolithography and fused deposit modeling and a subtractive manufacturing subsystem to remove a damaged part of the object as identified in the image; and
    a processor in communication with the scanner assembly and the manufacturing device to first analyze the image to determine whether to repair or replicate the object and then to operate the manufacturing device to at least one of replicate the object to create a replacement object with the additive manufacturing subsystem and repair the object with at least one of the subtractive manufacturing subsystem to remove the damaged part and the additive manufacturing subsystem to provide for a repaired object where the damaged part was removed, and the additive manufacturing subsystem to create a part segment to replace the damaged part.

2. The system according to claim 1, wherein the scanner to obtain a three dimensional image of the object for use to at least one of determine an extent of damage and to create a digital representation of the object wherein the digital representation is usable to create the second object.

3. The system according to claim 2, further comprising a housing to isolate the scanner and manufacturing device from a user.

4. The system according to claim 3, further comprising an internal environmental control unit to regulate an internal environment within a processing area to minimize contamination during at least one of repair and replication where the object is at least one of repaired and replicated.

5. The system according to claim 1, further comprising a user interface to at least one of provide control access to the system and to select a characteristic of at least one of the repaired object and the second object.

6. The system according to claim 1, further comprising a catalog comprising additive manufacturing reference information for use by the processor to at least one of repair the object and replicate the object.

7. The system according to claim 1, wherein the processor selects characteristics of the replacement object from a catalog based on additive manufacturing reference information obtained in the catalog that comprises a plurality of parts to create the replacement object.

8. The system according to claim 6, wherein the processor adds characteristics of the replacement object created to the catalog based on the image when a needed replacement object is omitted from the catalog.

9. The system according to claim 1, wherein the scanner inspects the at least one of a repaired object and a replacement object to determine quality of the at least one of the repaired object and the replacement object.

10. A system comprising:
one or more manufacturing systems comprising at least one or more additive manufacturing devices to at least one of repair an object with at least one of stereolithography additive manufacturing and fused deposit modeling additive manufacturing and replicate the object with at least one of stereolithography additive manufacturing and fused deposit modeling additive manufacturing;
a scanner assembly to at least one of scan an object to produce a first three dimensional image of an external surface of the object and a first internal image of the object for use to determine whether to at least one of repair and replicate the object, and to inspect at least one of the object repaired and the object replicated using the one or more manufacturing systems;
a housing to maintain the one or more manufacturing systems and scanner assembly in a controlled environment;
an environmental control unit to monitor and control an internal environment within the housing during at least one of the repair of the object and the replication of the object, to prevent outgassing and contamination caused from at least one of the repair of the object and the replication of the object; and
a processor in communication with the scanner assembly and the one or more manufacturing systems to determine whether to at least one of repair and replicate the object based on at least one of the three dimensional image of the external surface and the internal image of the object, to control the one or more manufacturing systems to at least one of repair and replicate the object, and to inspect at least one of the object after being repaired and a replicated object to determine quality based on a second three dimensional image and a second internal image taken by the scanner.

11. The system according to claim 10, wherein the one or more manufacturing systems comprises at least one cutting device used to perform one or more subtractive manufacturing processes to cut material away from the object to at least one of create the replicated object and to remove a part of the object which will be replaced when the object is repaired.

12. The system according to claim 10, further comprising a user interface to at least one of control the system and select a characteristic of at least one of a repaired portion of the repaired object and the replicated object.

13. The system according to claim 10, further comprising a catalog in communication with the processor comprising additive manufacturing reference information for use by the processor to determine whether to at least one of repair the object and replicate the object.

14. The system according to claim 10, wherein the processor selects a template from the catalog to create at least one of the replicated object and a portion of the object to repair, the template based on additive manufacturing reference information retained in the catalog.

15. The system according to claim 14, wherein the processor adds additive manufacturing reference information for at least one of the replicated object and the portion of the object to repair the object to the catalog based on the image when at least one of the object, the replicated object and the portion of the object is omitted from the catalog.

16. A method comprising:
scanning an object with a scanner assembly that is within a housing to create a three-dimensional representation of the object;
evaluating a resulting scan taken by the scanner assembly with a processor to determine whether to repair or replicate the object using at least one of an additive manufacturing process and a subtractive manufacturing process;
recommending with the processor whether to at least one of repair and replicate the object;
performing at least one of a repair of the object and replicate of the object with at least one of the additive manufacturing process and the subtractive manufacturing process that is located within the housing;
monitoring and controlling an internal environment where the scanning an object and the performing at least one of the repair and replicate with an environmental control system to reduce contamination caused by the at least one of repair and replicate; and
providing at least one of a repaired object and a replicated second object resulting from performing at least one of the repair of the object and replicate of the object for use.

17. The method according to claim 16, wherein when recommending to replicate the object, obtaining additive manufacturing reference information for the object maintained in a catalog, the catalog comprises a plurality of additive manufacturing reference information for various objects to replicate a respective object based on the reference information in the catalog.

18. The method according to claim 17, wherein when the reference information for the object is excluded from the catalog, refining the scan created by the scanner for use by the at least one additive manufacturing process and the subtractive manufacturing process to create the replicated second object.

19. The method according to claim 16, further comprising determining a quality of at least one of a replicated second object and a repaired portion of the object with the scanner assembly capturing at least one other image that is then evaluated with the processor to determine quality.

20. The method according to claim 16, wherein evaluating a resulting scan further comprises evaluating the resulting scan with a processor to autonomously determine whether to at least one of repair or replicate the object using at least one of the additive manufacturing process and the subtractive manufacturing process.

21. The method according to claim 16, wherein performing at least one of a repair of the object further comprises performing the subtractive manufacturing process on the object to remove a section from the object prior to performing the additive manufacturing process.

\* \* \* \* \*